United States Patent

Emerson

[15] 3,691,818

[45] Sept. 19, 1972

[54] METHOD FOR DETERMINATION OF IMPURITIES IN HELIUM GAS

[72] Inventor: David E. Emerson, Amarillo, Tex. 79106

[73] Assignee: The United States of America, as represented by the Secretary of the Interior

[22] Filed: March 27, 1970

[21] Appl. No.: 23,133

[52] U.S. Cl. .................................................73/23
[51] Int. Cl. ............................................G01n 7/04
[58] Field of Search..........73/23, 23.1, 29; 23/232 C, 23/254 R, 254 E, 255 R, 255 E

[56] References Cited

UNITED STATES PATENTS

| | | | |
|---|---|---|---|
| 3,311,454 | 3/1967 | Kemeny | 73/23 X |
| 3,557,604 | 1/1971 | Baecklund | 73/19 |
| 2,601,272 | 6/1952 | Frost | 73/23 |
| 3,135,108 | 6/1964 | Santeler | 73/23.1 |
| 3,211,006 | 10/1965 | Haley | 73/23.1 |

OTHER PUBLICATIONS

A. L. M. Keulemans, Gas Chromatography (Reinhold Publishing Corporation, New York, 1957) pp. 70, 71, 95.

C. L. Klingman, " Modified Chromatograph to Record Helium Content of Natural Gas Streams," The Review of Scientific Instruments, Vol. 32, No. 7, 7/61; 822– 4.

*Primary Examiner*—Richard C. Queisser
*Assistant Examiner*—C. E. Snee, III
*Attorney*—Ernest S. Cohen and William S. Brown

[57] ABSTRACT

The helium content of a gaseous mixture is determined by comparing the partial pressure of the helium in an unknown sample directly with the pressure of highly purity helium under the same conditions. The volume percent of helium in the unknown is equal to $(P_1/P_2) \times 100$, where $P_1$ is the partial pressure of helium in the sample and $P_2$ is the total pressure of an equal volume of high-purity helium.

The partial pressure of the helium in the unknown sample is initially determined by adsorption of gases other than helium on activated charcoal and measurement of the resulting helium pressure. The total pressure of high-purity helium is then measured under the same conditions as the sample.

1 Claim, 1 Drawing Figure

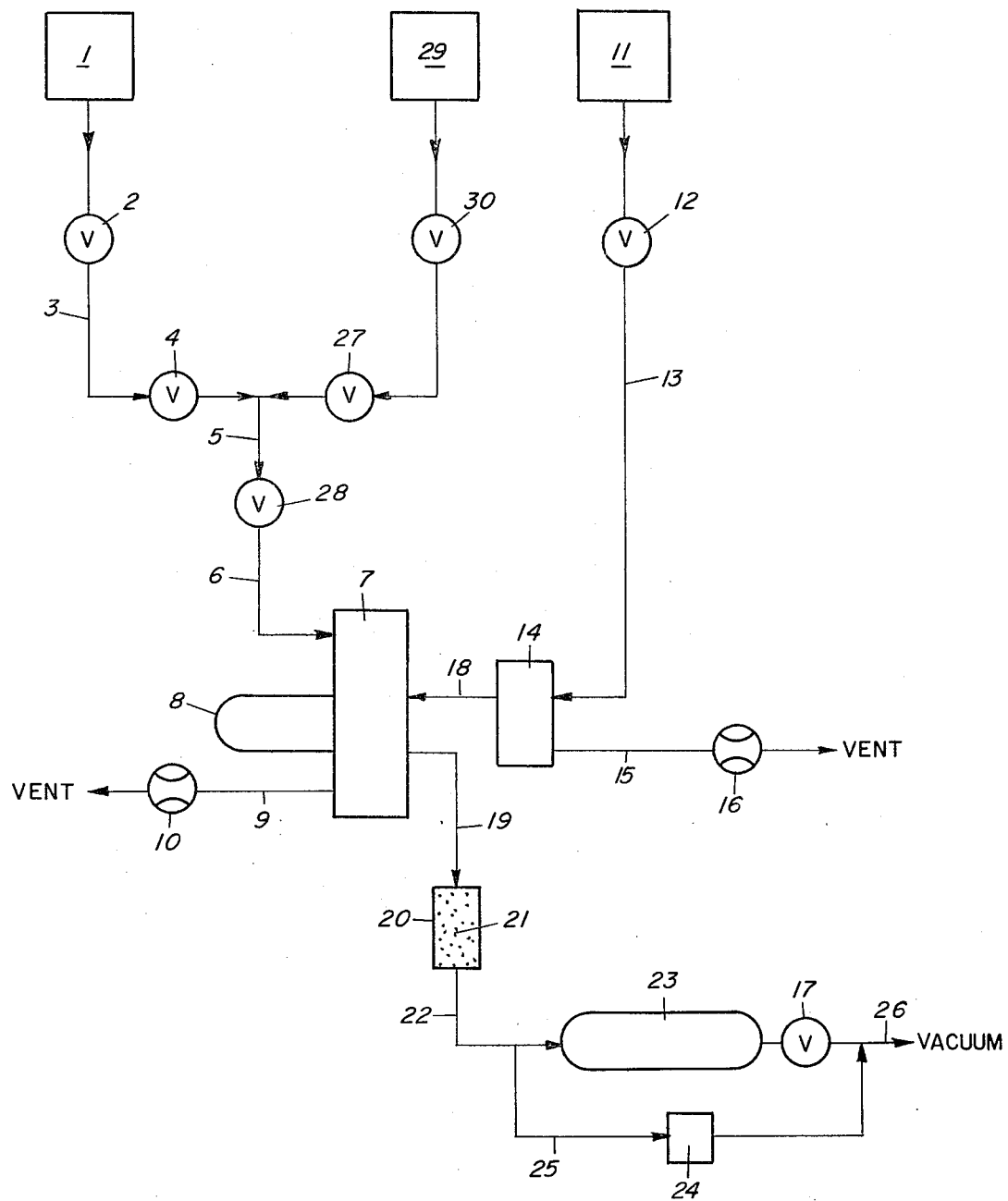

METHOD FOR DETERMINATION OF IMPURITIES IN HELIUM GAS

Various methods have been conventionally employed for analysis of the helium content of crude helium, particularly mass spectrometry and the procedure employing the Modified Frost Apparatus, described in Bureau of Mines Report of Investigations 6545. Neither of these, however, are primary standard methods, and both are expensive and require extensive calibration.

It has now been found, according to the method of the invention, that the helium content of a gaseous mixture may be accurately and economically determined by a procedure comprising (1) determining the partial pressure of the helium in the unknown sample and (2) determining the total pressure of high-purity helium under the same conditions. The volume percent of helium in the unknown is then calculated from the equation: $\%He_{vol} = P_1/P_2 \times 100$, where $P_1$ is the partial pressure of helium in the unknown and $P_2$ is the total pressure of an equal volume of high-purity helium. This results in a primary standard method of determining the helium content of samples containing from about 0.1 to 100 percent helium with an accuracy of ±0.07 percent. The method of the invention may be used for analysis of helium-containing natural gases, crude helium from industrial sources, helium in gases used in research, etc.

The partial pressure of the helium in the unknown is determined by adsorption of the gaseous components, other than helium and neon, on activated coconut charcoal at liquid nitrogen temperature (77° K). Since the neon is generally present only in the parts-per-million range, its pressure may be neglected. This method for adsorption of gases other than helium is conventional and is disclosed in the above-mentioned Report of Investigations 6545.

The helium is treated as an ideal gas because the total pressure in the apparatus employed does not exceed one atmosphere. According to Dalton's Law, the total pressure of a gaseous mixture is equal to the sum of the partial pressures of the components. The partial pressure is a fictitious pressure which each pure component would exert if it alone occupied the entire volume. The method of the invention determines the partial pressure of helium in the sample by adsorbing the other components on activated coconut charcoal at 77° K.

Therefore, if $P_1$ = the partial pressure of helium in the sample and
$P_2$ = the total pressure (a volume of high-purity helium equal to the volume of the unknown sample), then, $P_1/P_2 \times 100$ = percent helium in sample.

A total helium pressure measurement is required after each adsorption cycle. The adsorption of the gases other than helium changes the internal volume of the system, and the total pressure must be determined at the same volume as the partial pressure of helium in the sample.

In addition, it has been found that optimum precision is obtained by the use of helium-free nitrogen gas to sweep the sample gas into the area of the apparatus in which the charcoal is located, and in which the pressure measurements are made. This procedure is more fully explained in the following detailed description of the invention.

The invention will now be described in detail with reference to the FIGURE, which is a flow diagram of the method of the invention. Details of a suitable apparatus for practice of the invention are included in the following description; however, the specific apparatus is not the essence of the invention and many modifications of details of the apparatus will be apparent to those skilled in the art without departing from the inventive concept as defined in the claims.

In addition, maximum speed and efficiency of operation is achieved by proper timing of the various stages of the analytical procedure, as more fully described below. However, the exact time intervals employed may vary considerably, depending on the specific details of the apparatus employed, and are readily determined by one skilled in the art.

Operation of the apparatus in the analytical procedure of the invention is desirably automated by means of an electrical control unit. Flow of gases may, e.g., be controlled by cams which control solenoid-operated air-control valves, which in turn control the gas-flow valves. Such automation is also conventional in analytical instrumentation and is also obvious to one skilled in the art.

In this embodiment of the invention an essential aspect of the invention, i.e., measurement of the partial pressure of the helium in the sample and the pressure of the high-purity helium under the same conditions, is achieved by means of the following stages of operation: (1) collecting the sample gas in a sample loop, (2) pushing the sample gas from the sample loop into a zone where adsorption takes place and pressure measurements are made, (3) collecting the high-purity helium in the sample loop, and (4) pushing the high-purity helium from the sample loop into the adsorption and pressure-measuring zone.

STAGE 1

In this stage the sample gas from container 1 flows through metering valve 2, line 3 (⅛ inch steel tubing), valve 4, line 5, valve 28, line 6 and sample inject valve 7 to sample loop 8 (¼ inch steel tubing, 7 cm³ volume). From the sample loop the gas flows via line 9 to flowmeter 10 and is then vented to the atmosphere. The metering valve is a 20-turn valve for control of the gas flow to the flowmeter. Valve 4 is a three-port pneumatic on-off valve which is in the "on" position in this stage. Valve 7, the sample inject valve, is an eight-port pneumatic valve which, in this stage, is set to connect lines 6 and 9 with the sample loop. In this stage of the procedure the sample loop is initially purged of all gases except the sample and simultaneously filled with the sample gas.

Simultaneously, nitrogen gas flows from container 11 through metering valve 12, line 13, three-port on-off valve 14 and line 15 to nitrogen flowmeter 16 and is then vented to the atmosphere. Valve 14 is, of course, set to connect lines 13 and 15. The flow rate of the nitrogen is thus determined at the same time that the sample loop is being filled with the sample gas.

Also simultaneously, the adsorbent section of the apparatus, i.e., the section between valve 14 and valve 17 is evacuated to a pressure of about 0.1 Torr or less. This section includes line 18, between valves 7 and 14, line 19, charcoal trap 20, containing charcoal (3 grams, 50–60 mesh activated coconut charcoal) 21, line 22 (⅜ inch steel tubing), volume tank 23 and line 25, also ⅜ inch steel tubing. Volume tank 23, of 500 cm³ capacity, is employed to assure the movement of substantially all of the sample through the charcoal. Line 18 is closed at valve 14, while vacuum valve 17, also a pneumatic on-off valve, is open to permit evacuation via line 26. During this stage valve 7 is closed and the flow of gas sample is stopped at this point.

STAGE 2

After 39 seconds of operation stage 2 is begun by closing valve 28. This stops the flow of sample gas and reduces the sample pressure in the sample loop to atmospheric. In 9 more seconds valve 17 closes and valve 7 actuates, thereby connecting the lower leg of the sample loop 8 with line 19. In addition, actuation of valve 7 disconnects line 6 from the sample loop, thereby stopping the flow of sample gas at valve 7. Since the volume between valves 14 and 17, i.e., the adsorbent section, has been evacuated, the initial reaction of the sample, from atmospheric pressure to a vacuum, is to expand into the adsorbent section.

At the same time valve 14 is actuated to connect lines 13 and 18 and the upper leg of the sample loop, thereby diverting the nitrogen flow through the sample loop. Flow rate and time of nitrogen flow are correlated to provide sufficient nitrogen to push the sample out of the loop and into the adsorbent section. In so doing, the sample passes through the charcoal trap where gases other than helium and neon are adsorbed. Nitrogen flow rates of 1 cm³/minute to 40 cm³/minute have been found to be satisfactory; however, a rate of about 3 cm³/minute is preferred.

In 6 more seconds valves 7 and 14 deactivate, trapping the sample in the adsorbent section.

STAGE 3

In this stage valves 27 and 28 open, while valve 4 closes. This allows the high-purity helium from container 29 to flow through metering valve 30 and valves 27 and 28 to valve 7.

At the same time valve 7 is deactivated to again connect lines 6 and 9 with the sample loop. This allows the high-purity helium to flow through the sample loop, line 9, flowmeter 10 and then to the atmosphere. The sample loop is thereby flushed and filled with the high-purity helium.

Also at this time, a pressure measurement is obtained for the helium left in the sample in the adsorbent section after the charcoal has adsorbed gases other than helium and neon. This measurement is obtained by means of transducer 24, conveniently a 0–1 psid transducer with an electrical span set to give a reading of from 0 to 1.5 volts for the pressure of helium in the sample.

During this stage the nitrogen flow is again diverted through valve 14 to flowmeter 16 to reconfirm the flowrate of the nitrogen.

After the sample pressure reading is obtained, valve 17 opens and the adsorbent section is again evacuated for 361 seconds. A new cycle is then started in which the pressure of the pure helium is measured under the same conditions as that employed in obtaining the pressure of the helium in the sample.

STAGE 4

In this stage valve 17 closes, and after 5 seconds the liquid nitrogen is added to the charcoal trap. After another 15 seconds valve 28 closes to stop the flow of high-purity helium and reduce the helium pressure to atmospheric.

After another 9 seconds valves 7 and 14 actuate, as in Stage 2, and the high-purity helium from the sample loop is pushed into the adsorbent section by means of nitrogen. The exact conditions are thus duplicated for injecting the sample and the high-purity helium, respectively, into the adsorbent section.

Valve 7 then deactivates to isolate the high-purity helium from the sample loop in the adsorption section. At the same time a new sample is obtained in the sample loop in the same manner as in Stage 1.

A pressure measurement is then made on the high-purity helium in the adsorption section in the same manner as the measurement of the helium in the sample in Stage 3.

What is claimed is:

1. A method for analyzing a helium-containing gas comprising (1) isolating a specific volume of sample gas in a sample loop at atmospheric pressure, (2) utilizing a flow of a measured volume of nitrogen gas to sweep the sample from the sample loop into an enclosed adsorbent section containing activated charcoal, (3) contacting the thus-isolated sample with said charcoal at liquid nitrogen temperature for a time sufficient to adsorb gases other than helium, (4) measuring the pressure of the resulting gas consisting essentially of helium to determine the partial pressure of helium in the sample, (5) isolating the same volume of high-purity helium in the sample loop at atmospheric pressure, (6) utilizing a flow of the same volume of nitrogen gas to sweep the high-purity helium from the sample loop into the same adsorbent section containing the activated charcoal with adsorbed impurities, and (7) measuring the pressure of the thus isolated high-purity helium, whereby the helium content of the sample gas may be calculated from the equation:

$$\% He_{vol} = (P_1/P_2) \times 100$$

where the $He_{vol}$ is the percent of helium by volume in the sample, $P_1$ is the partial pressure of helium in the sample, and $P_2$ is the pressure of the high-purity helium.

* * * * *